May 31, 1966  J. M. HUNT  3,254,283

CONTINUOUS ROTATION SERVO

Filed May 15, 1963

JOHN M. HUNT
INVENTOR

BY Richard L. Stephens
ATTORNEY

United States Patent Office 3,254,283
Patented May 31, 1966

3,254,283
CONTINUOUS ROTATION SERVO
John M. Hunt, Binghamton, N.Y., assignor to General Precision, Inc., Binghamton, N.Y., a corporation of Delaware
Filed May 15, 1963, Ser. No. 280,675
6 Claims. (Cl. 318—29)

This invention relates to electrical servomechanisms, and more particularly, to an improved servomechanism controllable by direct current input signals through continuous and unlimited angles of rotation. In a variety of electronic computer, automatic control and simulation problems a need exists for such servomechanisms. Many computers, such as flight simulators, for example, utilize direct current analog computation in order to obtain the dynamic advantages which direct current integration offers over alternating current integration. Flight simulators which utilize digital computation generally utilize output digital-to-analog converts which provide direct current outputs signals. It is necessary in both types of simulators to provide servomechanisms which will provide shaft output positions which are directly proportional to, or proportional to desired functions, of such direct current output signals. In analog systems such servomechanisms frequently perform numerous computations within the computer as well as operating output indicators. In digital systems such servomechanisms usually perform no computation, but are required to position the needles of simulated instruments such as heading and bearing indicators.

Where the quantity represented by the direct voltage is limited in magnitude, a number of conventional servomechanisms are available to provide the necessary output shaft positions, but if the quantity must be capable of unlimited variation, which is frequently a characteristic of many angular quantities, it has been difficult to provide direct current controlled servomechanisms which will provide the necessary unlimited rotation, without errors or ambiguities which arise due to switching circuits which have been included in such servomechanisms. Servo indication of an inherently limited quantity such as airspeed, for example, may be provided simply by exciting the two ends of the winding of a conventional servo position feedback potentiometer with voltages proportional to zero airspeed and maximum possible airspeed, respectively, and the feedback voltage derived from such a potentiometer then will properly cancel out an opposite polarity input or command signal, so that such a servo will continuously provide an output shaft position commensurate with the command signal.

In most if not all prior simulators, the simulated aircraft has been capable of unlimited changes in heading and in bearing with respect to simulated radio stations, which is absolutely necessary for much useful training. While a number of other aircraft flight quantities, such as bank angle and pitch angle, are theoretically unlimited in rotation, they have been artificially constrained in most flight simulators because of the great expense which would be involved in simulating such quantities over an unlimited range, and because operation of many aircraft through unlimited bank angle (barrel rolls) and pitch angle (loops) is prohibited and never part of a training curriculum. As aircraft advance, it becomes more desirable to be able to indicate such unlimited quantities properly.

In most analog flight simulators, the necessarily unlimited heading has been computed by time integration of rate of change of heading voltages, by driving a velocity servo at a speed proportional to rate of change of heading. Because a velocity servo has no position feedback potentiometer, no switching is necessary as the servo shaft passes from 0 degree to 360 degrees or vice versa. Friction and other electromechanical limitations of velocity servos render such servos somewhat inaccurate, however, with the amount of inaccuracy accumulating with the time of simulated flight. While such inaccuracies have been tolerated in prior art simulators they are incompatible with the accuracies regarded as necessary in improved equipment.

In most analog flight simulators the necessarily unlimited bearing quantities between an aircraft and a station have been computed by means of servomechanism rectangular-to-polar coordinate converters using sine-cosine potentiometers. While such converters do not suffer from the accuracy limitations of velocity servos, the use of sine-cosine potentiometers makes them expensive, and, both because such potentiometers are in themselves expensive because the effect on servo operation attending use of such potentiometers frequently requires additional equipment, and because four amplifiers are usually required to excite the pair of sine-cosine potentiometers needed in such coordinate converters. The invention avoids use of sine-cosine potentiometers and uses only simple and inexpensive linear potentiometers, to provide servomechanisms having improved servo response, and fewer amplifiers are required.

In modern digital flight simulators many more limited quantities are required to be indicated than unlimited quantities, and various forms of digital-to-analog converters are available to provide suitable direct voltage analog signals for operating indicators to display the limited quantities. In the interests of economy and circuit simplicity, it is very desirable that the same digital-to-analog converters be capable of driving those indicators which require unlimited rotation. Furthermore, while certain quantities, such as altitudes, for example, may be theoretically limited, they may be required to be displayed with greater accuracy than is ordinarily obtainable in simple circuits with economically available conventional analog components. While a servo output shaft may be arranged to operate through plural revolutions by gearing it to a feedback potentiometer which operates through a single revolution the resolution of the feedback potentiometer then adversely affects servo operation. While multi-turn potentiometers may be used, they are extremely expensive if required to operate through many revolutions, and both types of prior system are inaccurate compared to the present invention. While various switching schemes are available to partially digitize widely-varying quantities, the jumps and discontinuities inherently attending switching render such schemes unrealistic. The invention allows smooth servo indication of such quantities. Thus it is a primary object of the present invention to provide an improved position servomechanism which will provide output shaft positions commensurate with values of a quantity which is theoretically unlimited, such as an angular quantity variable through plural revolutions.

It is another object of the invention to provide a position servomechanism type which does not require sine-cosine or other expensive nonlinear potentiometers.

It is a further object of the invention to provide a position servomechanism of the abovementioned type in which linear rebalancing potentiometers may be used and in which a fewer number of amplifiers are required.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Digital signals representing numerous flight, navigational, and environmental quantities are computed in digital computer 20, which may take the form, for example, of the digital flight simulator computer shown in my copending application Ser. No. 261,248, filed February 21, 1963, and these digital signals are converted to D.C. analog voltages by a digital-to-analog converter 21, which may take the form, for example, of the D./A. converter shown in detail in my copending application Serial No. 260,218, filed February 21, 1963. In a typical arrangement all of the digital numbers handled by computer 20 are in a fractional binary code, and all of the analog output voltages from D./A. converter 21 vary between plus 10 volts and minus 10 volts. Since the large majority of the D.C. analog voltages represent limited quantities, they may be applied either directly, or sometimes via buffer or power amplifiers or relays to operate various idicators, such as conventional servomechanisms, d'Arsonval meter movements, and the like.

In accordance with the invention, two separate analog output voltages are derived by computer 20 and converter 21 to operate each indicator which must be capable of either unlimited rotation or exceptional accuracy. It will be assumed in the discussion below that the quantity to be indicated by the servomechanism is an angular quantity which varies throughout plural revolutions. It will become readily apparent to those skilled in the art that the quantity could as well be simulated altitude quantity, in order that plural revolutions of the servo output shaft be available to drive a conventional geared altimeter indicator.

Figure 1:
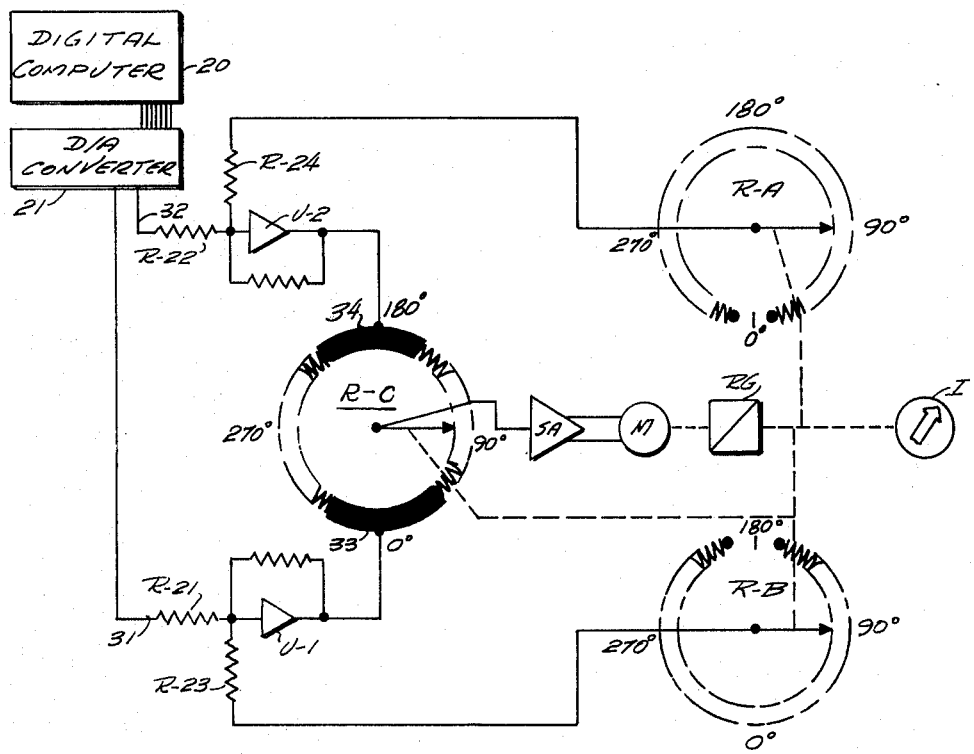
FIG. 1 is an electrical schematic diagram, partially in block form of one embodiment of the invention.
Figure 2:
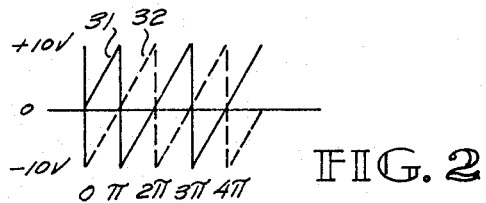
FIG. 2 is a waveform diagram illustrating the nature of the input signals applied to operate the servomechanism shown in FIG. 1.

In FIG. 1 analog voltages on terminals 31 and 32 are both derived to position a single heading indicator I. The voltage on line 31 which is shown in solid lines in FIG. 2, is arranged to vary between —10 volts and +10 volts as the computed value of heading varies between —180 degrees through zero degrees to +180 degrees. The voltage on line 32, however, which is shown in dashed lines in FIG. 2, is arranged to vary between —10 volts and +10 volts as the computed value of heading varies between zero degrees through +180 degrees ($\pi$) to +360 degrees ($2\pi$). As shown in FIG. 2, the outputs on lines 31 and 32 for continuous rotation comprise two sawtooth voltages 180 degrees out-of-phase with each other. As the angular quantity to be indicated varies through successive revolutions, the direct current voltages on lines 31 and 32 will be seen to vary as periodic functions of the angular quantity, the functions being illustrated as having a sawtooth form. As will become evident as the description proceeds, other periodic functions may be used. As the quantity to be indicated passes through 180 degrees and odd multiples thereof, it will be seen that the input command signal on line 31 effectively becomes discontinuous and resets from +10 volts to —10 volts, and that the signal on line 32 resets similarly at angular quantities displaced by 180 degrees. While various other periodic functions may be utilized in practicing the invention, it is a necessary characteristic of any pair of such input command signals that they both not reset (and preferably both not change in slope suddenly) at any single angular value, but instead that they undergo their necessary changes in direction or sudden changes in slope at mutually different values of the quantity to be indicated. In a typical simulator digital computer the two command voltages on lines 31 and 32 may be derived in straightforward fashion, usually by arc sine or arc tangent computation, so that the direct voltages from D./A. converter 21 periodically reset in a manner such as that shown in FIG. 2. Inasmuch as the details of generation of such command input signals will be readily apparent to those skilled in the art and does not form per se a part of this invention, the details of computer 20 and converter 21 need not be shown nor described herein.

The servomechanism is shown in FIG. 1 as including two linear follow-up potentiometers R–A and R–B having their wiper arms connected to be driven by the servomotor M via gear reduction RG, with the two potentiometer windings relatively rotated by 180 degrees. The two potentiometers are completely conventional, but their wiper arms are continuously rotatable, even past their winding gaps, and no stops are provided. As shown in FIG. 1, the gap between the ends of the winding of potentiometer R–A is centered at the zero degree position of the servomechanism, while the gap of potentiometer R–B is centered at the 180 degree position. In typical commercially available potentiometers the windings cover approximately 320 degrees and the gaps extend through approximately 40 degrees. The windings of potentiometers R–A and R–B are excited by constant plus and minus direct voltages A and B as shown. It will be recognized that both of the potentiometers R–A and R–B will be operable as long as their wiper arms traverse their windings to provide wiper arm voltages which vary in accordance with the servo shaft position, but that the wiper arm voltage on either of the potentiometers suddenly will drop to zero as the wiper arm passes over the gap between the ends of the winding. If the position feedback voltage in an ordinary position servo suddenly drops to zero, it will be recognized that the servo error signal will increase drastically, causing a violent and sudden change in the servo output shaft position. A central purpose of the present invention is to provide a servomechanism in which such jumps in shaft position do not occur.

The angular phasing between the gaps or inoperable zones of potentiometers R–A and R–B is chosen to correspond, at least substantially, with the phasing between the dicontinuous steep slope, or reset zones of the input command signals. Therefore, during one predetermined shaft position zone, during which one command signal is changing suddenly, one follow-up potentiometer is passing through its gap, or inoperable zone, and during another predetermined shaft position the other command signal is changing suddenly and the other follow-up potentiometer is passing through its inoperable zone. As shown above, by way of example, it is convenient to establish the command signal slope-change phasing and the follow-up potentiometer gap phasing at 180 degrees. By means to be described, the servomechanism of the present invention operates automatically always to be controlled by the command signal which is not at its change-of-slope value and always to be controlled by the follow-up potentiometer which is not positioned in its operable zone, with the control of the servomechanism changing smoothly from one command signal-feedback potentiometer pair to the other command signal-feedback potentiometer pair as the servo turns through plural revolutions in either direction.

Also connected to have its wiper arm positioned by servomotor M is a third follow-up potentiometer R–C having portions of its winding shorted for small distances, as shown by the heavy lines in FIG. 1, surrounding the zero degree and 180 degree positions of the servomechanism, and electrical connections are made to the shorted portions at terminals 33 and 34.

Figure 3:
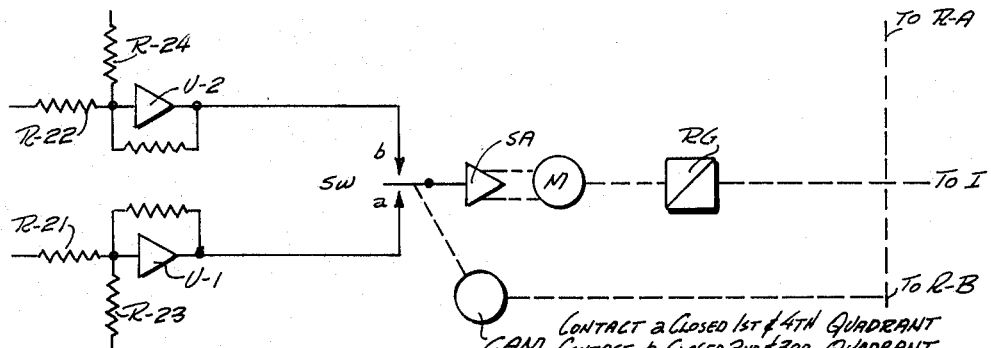
FIG. 3 illustrates a portion of an alternative rudimentary embodiment of the invention of FIG. 1.

The input command voltage on line 31 is applied from D./A. converter 21 via scaling resistor R–21 to a conventional direct-coupled analog operational amplifier U–1 to be summed with a first feedback voltage derived by the wiper arm of potentiometer R–B and applied via scaling resistor R–23, and the output voltage of amplifier U–1, which comprises a first error voltage, is connected to terminal 33 of potentiometer R–C. It will be seen that the first error voltage will change drastically whenever the command signal on line 31 changes slope and whenever the arm of potentiometer R–B enters or leaves the gap in the resistance element of potentiometer R–B, both of which occur within an angular zone near the 180 degree position (or odd multiples thereof) of the servo output shaft. The input command voltage on line 32 is applied via scaling resistor R–22 to a similar amplifier U–2 to be summed with another feedback voltage derived by the wiper arm of potentiometer R–A and applied via R–24, and the output voltage of amplifier U–2, which comprises a second error voltage, is connected to terminal 34 of potentiometer R–C. It will be seen that the second error voltage will change drastically whenever the input command signal on line 32 changes slope and whenever the arm of potentiometer R–A enters or leaves its associated resistance element gap, both of which occur within an angular zone near the zero (or 360) degree position of the servo output shaft. The output voltage on the wiper arm of potentiometer R–C is connected to a conventional servoamplifier SA, the output of which is connected to drive servomotor M. If desired, servoamplifier SA may incorporate a chopper or modulator such as a magnetic amplifier and motor M may comprise an induction motor, as is well known in the art. Potentiometer R–C, the wiper arm of which is positioned by the servo output shaft, operates to select between the first and second error signals, and to insure that the resultant error signal applied to servoamplifier SA is not derived from a command signal which may suddenly change slope nor from a follow-up potentiometer which is entering or leaving its associated gap. In a rudimentary form of the invention potentiometer R–C may be replaced by a selector switch SW (FIG. 3) operated by a cam on the servo shaft, to use only the error signal from U–1 when the servo is operating in the first and fourth quadrants, and to use only the error signal from U–2 when the servo is operating in the second and third quadrants, and in such an arrangement the servo will not be controlled by a command signal undergoing a sudden slope change nor by a follow-up potentiometer operating near its gap. In an especially economical form of the invention, amplifiers U–1 and U–2 may themselves be omitted, by connecting R–22 and R–24 directly to contact $b$ and by connecting R–21 and R–23 directly to contact $a$. In the rudimentary embodiment of FIG. 3, however, a jump in servo output shaft position may result upon translation of switch SW unless the characteristics of potentiometer R–B, those of amplifier U–1 and its associated resistances, and those of the line 31 command signal quite exactly match those of R–A, amplifier U–2 and the command signal on line 32. Therefore, I prefer to utilize a smooth interpolating or proportioning means such as potentiometer R–C in FIG. 1, thereby completely avoiding jumps due to switching.

It will be seen that throughout most of the rotation of the servo-mechanism that identical, or substantially identical, output voltages will be provided from the two amplifiers. For example, at +90 degrees, the wiper arm position shown in FIG. 1, +5 volts will be applied to terminal 31 and −5 volts at terminal 32 (as will be evident from FIG. 2). A negative voltage of 5 volts derived from the wiper arm of potentiometer R–B applied via resistor R–23 will make the output of amplifier U–1 zero. Similarly, the positive voltage from the arm of potentiometer R–A will cancel out the negative input on line 32. Thus, both terminals 33 and 34 of potentiometer R–C will carry zero voltage, providing zero input signal to servoamplifier SA, and the servo output shaft will remain at rest in the 90 degree position shown. When the wiper arm of potentiometer R–C is engaging the shorting band at terminal 33 it will be seen that the error signal applied to amplifier SA corresponds exactly to the output signal from amplifier U–1, that when the arm is at the band of terminal 34 the resultane error signal will correspond exactly to the amplifier U–2 output signal, and that whenever the arm of potentiometer R–C is between the two bands and engaging one of the resistance sections, the resultant error signal will be weighted, or proportioned between the first and second error signal, so that the contribution of each of the first and second error signals to the resultant error signal will be dependent upon the angular distances of the two error-signal deriving means from their inoperable or steep change-of-slope zones.

It will be seen that potentiometer R–C interpolates between the first and second error signals applied to terminals 33 and 34, smoothly changing servo control from the U–1 error signal output to the U–2 error signal output as the servo approaches its 180 degree position from either direction, and smoothly changing servo control from the U–2 error signal output to the U–1 error signal output as the servo approaches the 0 degree position from either direction. Potentiometer R–C is shown provided with two shorted bands surrounding the zero degree and 180 degree positions. The width of the shorting bands is in no way critical except that they should be slightly wider than the gaps in the potentiometers, and wider than the steep slope portion of the command signal characteristic, and in practice they may be considerably wider than either.

The servomechanism may include lag and lead circuits, tachometer stabilization and a variety of well-known refinements, none of which are shown, but most of which are well-known to those skilled in the art.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property of privilege is claimed are defined as follows:

1. A servomechanism operable continuously through plural revolutions to provide an output shaft position commensurate with the value of a quantity, comprising, in combination: means for deriving first and second command signals which vary in accordance with first and second periodic functions of said quantity, said periodic functions being selected so as not both to be discontinuous at any value of said quantity; first summing means for combining said first command signal and a first feedback signal to derive a first error signal; second summing means for combining said second command signal and a second feedback signal to derive a second error signal; a first position-to-electrical signal transducer operable over a first zone of the rotation of said output shaft to derive said first feedback voltage and inoperable over a second zone of the rotation of said output shaft; a second position-to-electrical signal transducer operable over a third zone of the rotation of said output shaft to derive said second feedback voltage and inoperable over a fourth zone of the rotation of said output shaft; an amplifier connected to amplify a weighted error signal; a motor connected to be driven by said amplifier, said motor being connected to drive said output shaft; and interpolating means connected to said output shaft and to said first and second error signals for interpolating between said first and second error signals to provide said weighted error signal, the weights of said first and second error signals in said weighted error signal being proportioned in accordance with the adjustments of said first and second transducers from said second and fourth zones, respectively, of the rotation of said output shaft.

2. A servomechanism continuously operable throughout plural revolutions to provide an output shaft position angle commensurate with the value of a quantity, comprising, in combination: means for deriving first and second command signals which vary in accordance with first and second periodic functions of said quantity, said periodic functions being selected so as not both to be discontinuous at any value of said quantity; first summing means for combining said first command signal and a first feedback signal to derive a first error signal; second summing means for combining said second command signal and a second feedback signal to derive a second error signal; a first positon-to-electrical signal transducer operable over a first zone of the rotation of said output shaft to derive said first feedback voltage and inoperable over a second zone of the rotation of said output shaft; a second position-to-electrical signal transducer operable over a third zone of the rotation of said output shaft to derive said second feedback voltage and inoperable over a fourth zone of the rotation of said output shaft; an amplifier connected to amplify a weighted error signal; a motor connected to be driven by said amplifier, said motor being connected to drive said output shaft; and proportioning means coupled to said first and second error signals for providing a further error signal variably proportionate to said first and second error signals, said proportioning means being adjusted by said output shaft to control the proportionality and effective to render said further error signal substantially equal to said first error signal when said shaft is positioned at said fourth zone of rotation and substantially equal to said second error signal when said shaft is positioned at said second zone of rotation, and to linearly decrease the proportion of said first error signal and linearly increase the proportion of said second error signal in said further error signal upon rotation of said shaft from said fourth zone toward said second zone.

3. A servomechanism operable to provide an output shaft position commensurate with the value of an angular quantity continuously variable through plural revolutions, comprising, in combination: means for deriving first and second command signals which vary as periodic functions of said quantity as said quantity varies through plural revolutions; an output shaft; first and second potentiometers connected to be adjusted by said shaft, each of said potentiometers being operable over an angular zone of rotation of said shaft to provide an output voltage and being inoperable throughout rotation of said shaft through another angular zone, said potentiometers being phased so that the two inoperable zones of the two potentiometers occur at respectively different and non-overlapping angular zones, thereby to provide first and second position feedback voltages which become discontinuous at different shaft positions; a pair of summing means for combining said first and second position feedback voltages respectively with said first and second command voltages to provide first and second error signals; proportioning means operated by said shaft for interpolating between said first and second error signals, to provide a further error signal weighted in accordance with angular relationships between the instantaneous shaft position and the inoperable zones of said potentiometers; an amplifier connected to amplify said further error signal; and a motor connected to be driven by the output from said amplifier, said motor being connected to position said output shaft.

4. A servomechanism operable continuously through plural revolutions to provide an output shaft position commensurate with the value of a quantity in response to first and second input command signals which vary in accordance with first and second periodic functions of said quantity, said periodic functions being selected so as not both to be discontinuous at any one value of said quantity, comprising in combination: means for combining said first command signal and a first feedback signal to derive a first error signal; means for combining said second command signal and a second feedback signal to derive a second error signal; a first position-to-electrical signal transducer operable over a first zone of rotation of said output shaft to derive said first feedback voltage and inoperable over a second zone of the rotation of said output shaft; a second position-to-electrical signal transducer operable over a third zone of the rotation of said shaft to derive said second feedback voltage and inoperable over a fourth zone of the rotation of said output shaft; an amplifier connected to amplify a selected error signal; a motor connected to be driven by the output of said amplifier, said motor being connected to drive said output shaft; and selection means connected to said output shaft and to said first and second error signals for gradually proportioning the respective amounts of said error signals being applied to said amplifier as a further function of the position of said output shaft, said function being continuous at least in the range of output shaft positions between said second and fourth zones, and to apply said first error signal to said amplifier when said output shaft is positioned within said fourth zone and to apply said second error signal to said amplifier when said output shaft is positioned within said second zone.

5. Apparatus according to claim 4 in which said selection means comprises a potentiometer connected to be excited by said first and second error signal and connected to be positioned by said output shaft.

6. Apparatus according to claim 5 in which said potentiometer includes two resistance element sections interconnected at their ends by first and second conductive sections, and in which said first and second error signals are connected to said first and second conductive sections, respectively.

References Cited by the Examiner

UNITED STATES PATENTS

| | | | |
|---|---|---|---|
| 2,384,622 | 9/1945 | Isserstedt | 318—29 |
| 2,395,708 | 2/1946 | Alexanderson et al. | 318—28 |
| 2,786,169 | 3/1957 | Muffly | 318—29 |
| 2,861,233 | 11/1958 | McKeown | 318—29 |

JOHN F. COUCH, *Primary Examiner.*